United States Patent Office 2,697,721
Patented Dec. 21, 1954

2,697,721
AMINE SALTS OF TRICHLOROACETIC ACID

James A. Kelly, Midland, Mich., assignor to The Dow Chemical Company, Midland, Mich., a corporation of Delaware No Drawing. Application May 28, 1951,
Serial No. 228,770

The portion of the term of the patent subsequent to May 29, 1968, has been disclaimed 3 Claims. (Cl. 260—501)

This invention is directed to new amine salts of trichloroacetic acid of the formula:

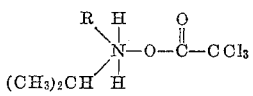

wherein R is hydrogen or an isopropyl radical. These compounds are white, crystalline solids of low hygroscopicity, substantially insoluble in organic, non-polar solvents but readily soluble in water. They may be used for the control of weeds and in histological and pharmaceutical compositions.

The new compounds may be prepared by any suitable method, as by reacting one molecular proportion of trichloroacetic acid with at least one molecular proportion of an amine of the formula:

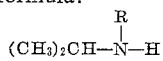

wherein R has the meaning as set forth above.

In a preferred method of preparation, one molecular proportion of isopropylamine or diisopropylamine is added portionwise with stirring to an aqueous solution of one molecular proportion of trichloroacetic acid. The mixture may be cooled during this phase of the reaction. In practice it has sometimes been found advantageous to add up to 10 percent excess of amine to assure complete neutralization of the trichloroacetic acid. Upon completion of the reaction, the desired product may be obtained in substantially pure form by crystallization from the reaction medium. Mother liquors from the crystallization may be recovered for subsequent use as reaction medium for the preparation of more of the product.

In an alternative procedure, the preparation of these compounds may be carried out by dissolving the trichloroacetic acid in benzene or a similar aromatic solvent and adding thereto the appropriate molar proportion of isopropylamine or of diisopropylamine. In this variation of the preparation, the desired product, being relatively insoluble in the reaction medium, precipitates as the reaction proceeds.

The following examples set forth specific embodiments of the invention but are not to be construed as limiting the same.

Example 1

66 grams (1.1 moles) of isopropylamine were dissolved in 161 grams of water with stirring. To the above solution 162 grams of trichloroacetic acid were added portionwise while stirring was continued. A vigorous reaction ensued with the evolution of heat. Cooling was instituted and on completion of the reaction, the mixture was further cooled to below room temperature to separate the reaction product from the mother liquor as a crystalline mass. The latter was isolated by filtration and dried to obtain an isopropylammonium trichloroacetate product. This product was a crystalline solid softening above 105° C. with decomposition and containing 47.7 percent by weight of chlorine and 6.29 percent by weight of nitrogen. The theoretical chlorine content and nitrogen content for $C_5H_{10}Cl_3NO_2$ are 47.8 percent and 6.29 percent, respectively.

Example 2

In a reaction vessel equipped with a cooling coil, 328 grams (2 moles) of trichloroacetic acid were dissolved in 500 cc. of water. To this solution 118 grams (2 moles) of isopropylamine were added portionwise with stirring. In the latter operation, cooling was maintained and the addition of isopropylamine was carried out at such a rate that the temperature of the reaction mixture did not rise above 27° C. Upon completion of the reaction the vessel and contents were cooled to 14.5° C., the mixture separating into an aqueous mother liquor and a crystalline mass. The latter was separated by filtration and dried to obtain an isopropylammonium trichloroacetate product. This product was a crystalline solid, soluble in water.

Example 3

In a vessel equipped with a stirrer and a cooling coil, 328 grams (2 moles) of trichloroacetic acid were dissolved in 500 cc. of benzene. To this solution 118 grams (2 moles) of isopropylamine were added portionwise. In the latter operation cooling was maintained and the addition of isopropylamine carried out at such a rate that the temperature of the reaction mixture did not rise above 27° C. The separation of the reaction product was then carried out as in Example 2 to obtain an isopropylammonium trichloroacetate product as a crystalline solid.

Example 4

162 grams of trichloroacetic acid were dissolved in 161 grams of water at 16° C. To this solution 117 grams of diisopropylamine were added rapidly with stirring. In the latter operation heat was evolved and the temperature of the reaction mixture rose to 74° C. Upon completion of the reaction, the vessel and contents were cooled to 33° C., the mixture separating into a liquid mother liquor layer and a crystalline mass. The latter was isolated by filtration and dried to obtain a diisopropylammonium trichloroacetate product. This product was a white, crystalline solid, softening above 91° C. with decomposition.

Example 5

Isopropylammonium trichloroacetate was dissolved in water and the resulting solution applied to the surface of soil containing the seeds of gramineous weeds. The application was regulated so as to distribute the isopropylammonium trichloroacetate at the rate of 40 pounds per acre. Similar soil areas were left untreated to serve as controls. The areas were observed later when a vigorously growing stand of gramineous weeds was found in the untreated areas. In contrast, the area treated with isopropylammonium trichloroacetate was observed to contain only a straggling emergence of gramineous weeds which were grossly malformed and failed to mature.

Example 6

Diisopropylammonium trichloroacetate is thoroughly mixed and ground together with an equal weight of diatomaceous earth. The resulting mixture is distributed evenly over the surface of soil infested with quack grass rhizomes at such a rate as to apply 60 pounds of diisopropylammonium trichloroacetate per acre. Later observations indicate practically complete suppression of quack grass growth in the treated area.

I claim:
1. An amine salt of trichloroacetic acid of the formula:

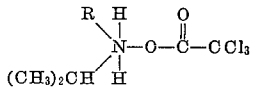

wherein R is a member of the group consisting of hydrogen and an isopropyl radical.
2. Isopropylammonium trichloroacetate.
3. Diisopropylammonium trichloroacetate.

References Cited in the file of this patent
UNITED STATES PATENTS

| Number | Name | Date |
|---|---|---|
| 2,288,413 | Morgan | June 30, 1942 |
| 2,330,524 | Shields | Sept. 28, 1943 |
| 2,393,086 | Bousquet | Jan. 15, 1946 |
| 2,554,972 | Alquist et al. | May 29, 1951 |

OTHER REFERENCES

Wheeler et al.: J. Am. Chem. Soc. 49, 1091–3 (1927).
Boudet: Bull. Soc. Chim., France, 1948, 390–2.
Dunham et al.: Chem. Abstracts 43, 7625 (1949).